(12) United States Patent
Cipriani (10) Patent No.: US 10,113,865 B2
(45) Date of Patent: Oct. 30, 2018

(54) SYSTEM AND METHOD FOR CHECKING THE MUTUAL POSITION OF COMPONENTS OF A WORKPIECE AND EQUIPMENT USING SUCH SYSTEM AND METHOD

(71) Applicant: Marposs Societa' Per Azioni, Bentivoglio (BO) (IT)

(72) Inventor: Riccardo Cipriani, Ferrara (IT)

(73) Assignee: Marposs Societa' Per Azioni, Bentivoglio (bo) (IT)

( * ) Notice: Subject to any disclaimer, the term of this patent is extended or adjusted under 35 U.S.C. 154(b) by 250 days.

(21) Appl. No.: 15/036,966

(22) PCT Filed: Nov. 11, 2014

(86) PCT No.: PCT/EP2014/074249
§ 371 (c)(1),
(2) Date: May 16, 2016

(87) PCT Pub. No.: WO2015/071249
PCT Pub. Date: May 21, 2015

(65) Prior Publication Data
US 2016/0290795 A1    Oct. 6, 2016

(30) Foreign Application Priority Data

Nov. 12, 2013 (IT) .............................. BO2013A0617

(51) Int. Cl.
*G01C 3/08* (2006.01)
*G01B 11/27* (2006.01)
(Continued)

(52) U.S. Cl.
CPC .......... *G01B 11/272* (2013.01); *G01B 5/0002* (2013.01); *G01B 11/2433* (2013.01); *G11B 5/4806* (2013.01); *G11B 5/6082* (2013.01)

(58) Field of Classification Search
CPC ................ G01B 11/272; G01B 5/0002; G01B 11/2433; G11B 5/4806; G11B 5/6082
See application file for complete search history.

(56) References Cited

U.S. PATENT DOCUMENTS 5,278,634 A * 1/1994 Skunes .................. G01D 5/342
356/400
6,425,188 B1 7/2002 Danielli
(Continued)

FOREIGN PATENT DOCUMENTS

CN        101178318 A    5/2008
WO    WO 99/24785 A1    5/1999

*Primary Examiner* — Samantha K Abraham
(74) *Attorney, Agent, or Firm* — Blank Rome LLP; Mark J. Thronson; Tara L. Marcus (57) ABSTRACT

A system for checking the axial position of a bearing (30) inside an hole (31) of an E-block (29), preferably during the assembly of an HSA, comprises a reference system (3) that locates the E-block, a coupling element (17) that comes into contact with the bearing, a floating element (8) that, being connected to the coupling element, assumes the attitude of the bearing, two or more detection devices, for example optoelectronic, that cooperate with the floating element and detect at the same time, at checking areas are spaced apart from each other, quantities indicative of the position and, in case, of the attitude of the bearing with respect to the E-block, and a processing unit (50) for receiving and processing the detected quantities. A corresponding method for checking comprises the steps of locating E-block and bearing to mutually movable parts of the reference system, detecting at the same time, at least at two checking are spaced apart from each other, quantities indicative of the position and in case, of the attitude of the bearing with respect to the E-block, and processing the detected quantities. The invention relates also to an equipment and a method for assembling HSAs, that respectively employ the above- (Continued)

mentioned system and method for checking the mutual position and, in case, the attitude of the bearing with respect to the E-block.

12 Claims, 4 Drawing Sheets

(51) Int. Cl.
*G01B 5/00* (2006.01)
*G01B 11/24* (2006.01)
*G11B 5/48* (2006.01)
*G11B 5/60* (2006.01)

(56) References Cited

U.S. PATENT DOCUMENTS

| | | |
|---|---|---|
| 8,203,701 B2 | 6/2012 | Cipriani et al. |
| 2006/0139656 A1 | 6/2006 | Kulawiec et al. |
| 2006/0152711 A1 | 7/2006 | Dale et al. |
| 2008/0028629 A1 | 2/2008 | Schroter et al. |
| 2008/0195352 A1 | 8/2008 | Cipriani |

* cited by examiner

SYSTEM AND METHOD FOR CHECKING THE MUTUAL POSITION OF COMPONENTS OF A WORKPIECE AND EQUIPMENT USING SUCH SYSTEM AND METHOD

TECHNICAL FIELD

The present invention relates to a system for checking the mutual position of a second component of a workpiece relative to a first component of the workpiece, the first component being apt to define an axis, comprising a reference system apt to define a reference plane and a main axis perpendicular to the reference plane, and locate the first component of the workpiece so that the axis of the first component is aligned to the main axis, a detection system adapted to define at least a first checking area and a second checking area spaced apart from each other, and detect, at said at least first and second checking areas, quantities indicative of said mutual position of the second component of the workpiece relative to the first component of the workpiece, and a processing unit connected to the detection system, adapted to receive and process such quantities in order to find out information about said mutual position.

The invention also relates to a method for checking the mutual position of a second component of a workpiece relative to a first component of the workpiece, the first component being apt to define an axis, comprising the steps of locating the first component of the workpiece to a reference system apt to define a reference plane and a main axis perpendicular to the reference plane, so that the axis of the first component is aligned to the main axis, defining at least a first checking area and a second checking area spaced apart from each other, detecting at said at least first and second checking areas quantities indicative of the mutual position, and processing such quantities in order to find out information about the mutual position.

The invention also relates to an assembly equipment and a relative method for assembling two components of a workpiece, that use said system and method, respectively, for checking the mutual position of the same components.

The present invention can be advantageously, but not exclusively, used for checking, for example, axial position of a bearing within a suitable hole of an E-block during the assembly phase, the bearing and the E-block being part of an hard disk, which the description that follows will explicitly refer without loss of generality.

PRIOR ART

The hard disk storage units or hard disks are devices for storing and recalling data, broadly used in electronic systems, for example computers. Hard disks typically include one or more magnetic read/write heads, each connected to a slider and placed near a surface of a rotating magnetic disk. In the current hard disks, when the magnetic disk is driven into rotation, a thin air cushion forms between said magnetic disk and the slider, enabling the latter to slide over the disk at a distance which is in the range of at most a few tens of nanometers. During such rotation, the magnetic read/write heads can be employed to read/write bits of data within one of the magnetic track on the surface of the magnetic disk.

Each head and the associated slider are part of a so-called Head Gimbal Assembly or HGA, which comprises also a resilient thin plate, one end thereof carrying the head by means of a joint. At the end opposite with respect to the end carrying the head, each thin plate is connected to one of numerous mutually parallel wings of a support that is called E-block. The assembly of the E-block and all the HGAs is called Head Stack Assembly or HSA and is employed for reading/writing on one face or both faces of one or more magnetic disks. The E-block is equipped with a suitable hole intended for inserting a bearing, through which the HSA is coupled to fixed parts of the hard disk and is able to rotate, for example in response to a moment applied by a motor of the Voice Coil Motor or VCM type, in order to move the magnetic heads on the magnetic tracks.

Inserting the bearing in the suitable hole of the E-block is one of the main phases of a method for assembling an HSA. The greater the precision with which it is carried out, the better and more reliable on a quality level the performance of magnetic read/write heads is. For example, in case the bearing and the hole of the E-block have no end with limit stop intended for defining a wanted axial position, it is appropriate to carry out, during the phase of inserting, a continuous check of the position of a selected surface of the bearing in order to establish the stop of the insertion when the selected surface reaches a wanted height. If the selected surface under check takes a height different from the wanted one, indeed, the proper operation of the HSA inside the hard disk can be compromised. In addition, when the bearing is in the appropriate position inside the E-block, it is advantageous to have information about the attitude of the component. If the axis of the bearing does not coincide, for example it makes a not negligible angle, with the axis of the hole wherein the bearing is inserted, indeed, the rotation of the components connected through said bearing is not proper and, as a consequence, the magnetic heads risk taking an improper disposition, i.e. position and attitude, with respect to the disk, damaging the reading/writing functions. In addition, the force the bearing applies, while rotating, on the inner walls of the hole, can cause scratching and scraps, or even deformations and breakages of one component or both components, damaging the hard disk and its operation.

The U.S. Pat. No. 8,203,701B2 shows an optoelectronic equipment of the static type for checking the attitude, in terms of roll and pitch angles, and the height of components of workpieces, in particular a bearing housed in the E-block of an assembled HSA, that are fundamental in order to evaluate the attitude of the sliders and, as a consequence, of the read/write magnetic heads. Said equipment comprises a reference system including a floating element apt to reproduce the attitude of the bearing housed in the E-block, an optoelectronic detection device that provides signals indicative of attitude and height of the floating element, and a processing unit that receives the signals of the optoelectronic detection device and processes them for checking the roll and pitch angles and the height of the bearing. In more detail, for checking the roll angle, a detection is carried out at a predetermined checking area of the floating element, whereas, for checking the pitch angle and the height, it is necessary to carry out a detection at a first transversal section, then place the detection device at a second different transversal section, and carry out a distinct detection, both the transversal sections being part of a further predetermined checking area of the floating element, different from the preceding one.

The known equipment, however, can not be used in checking the mutual position of the components of a workpiece, for example a bearing of an hard disk, in particular in checking the assembly process of the workpiece, for example during the insertion of the bearing in a suitable hole of the E-block of the HSA. Indeed, the known equipment, as it needs procedures for placing and moving detection devices to obtain information about the height of the bearing, does not enable checking in real time the instant position of the bearing in order to control and stop the insertion at the appropriate instant.

DISCLOSURE OF THE INVENTION

Object of the present invention is to provide a system and a method for checking the mutual position of a second component of a workpiece relative to a first component of a workpiece, such as checking the position of a bearing during the insertion in the suitable hole of an E-block, said system and method being easily and cheaply implemented and ensuring reliable results.

Object of the present invention is also to provide an assembly equipment and the relative method for assembling the components of a workpiece, which have flexibility of use, allow automating and accelerating the process and obtain very reliable results.

These and other objects are achieved by a checking system and a method for checking, and by an assembly equipment and a method for assembling according to the enclosed claims.

A main advantage of the present invention consists in the opportunity of checking the mutual position and, at the same time, the attitude of components of a workpiece, in particular of having all the information necessary to check also the attitude of said components when the wanted axial position has been reached.

These and other objects and advantages of the present invention will become apparent from the detailed description that follows.

BRIEF DESCRIPTION OF THE DRAWINGS

The present invention is now described with reference to the attached drawings, given by way of non-limiting examples, wherein.

BEST MODE FOR CARRYING OUT THE INVENTION

Figure 1:
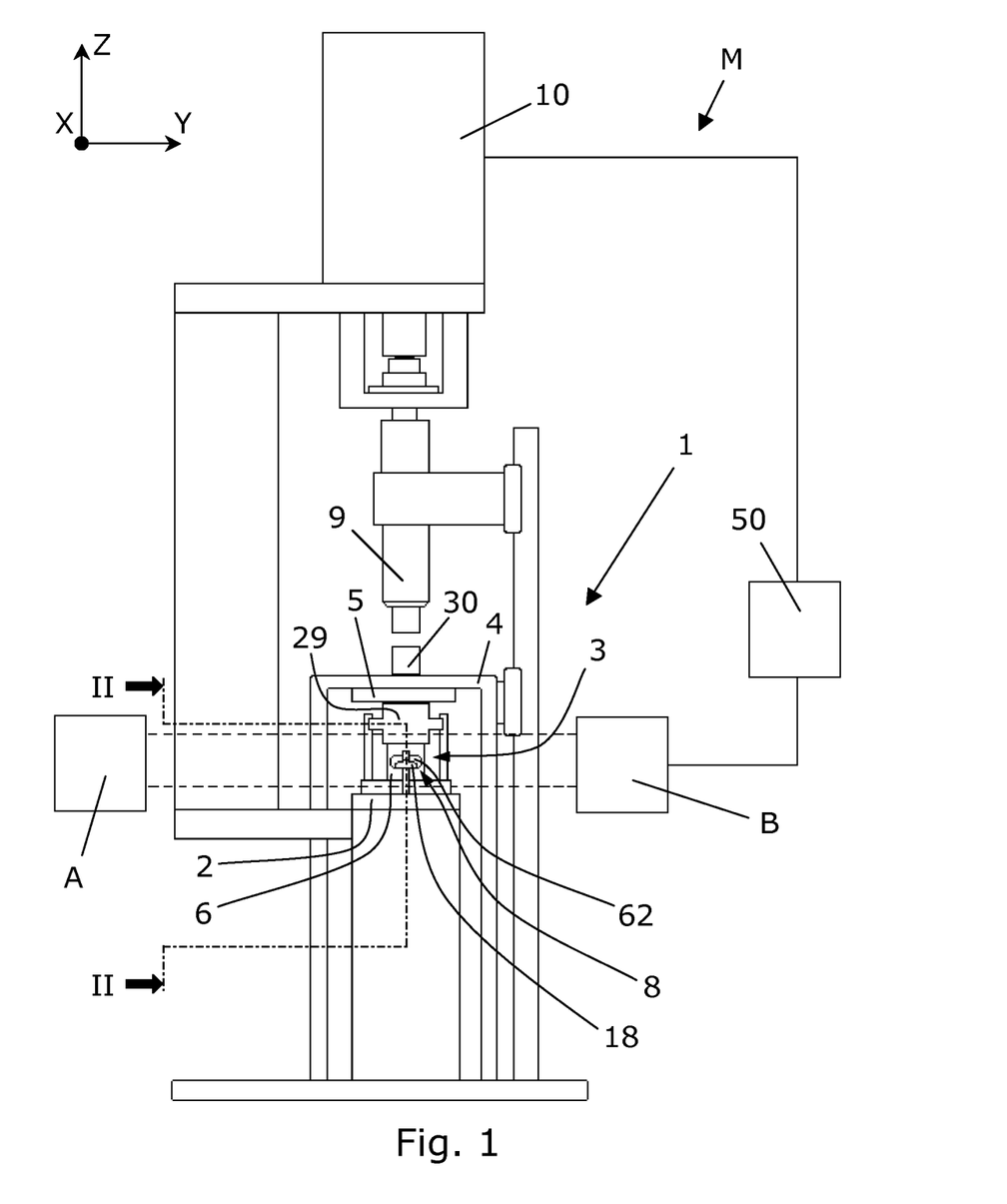
FIG. 1 is a schematic view of the longitudinal section of an equipment for assembling components of a workpiece, comprising a checking system according to a preferred embodiment of the present invention, with some details omitted for the sake of simplicity.
Figure 3:
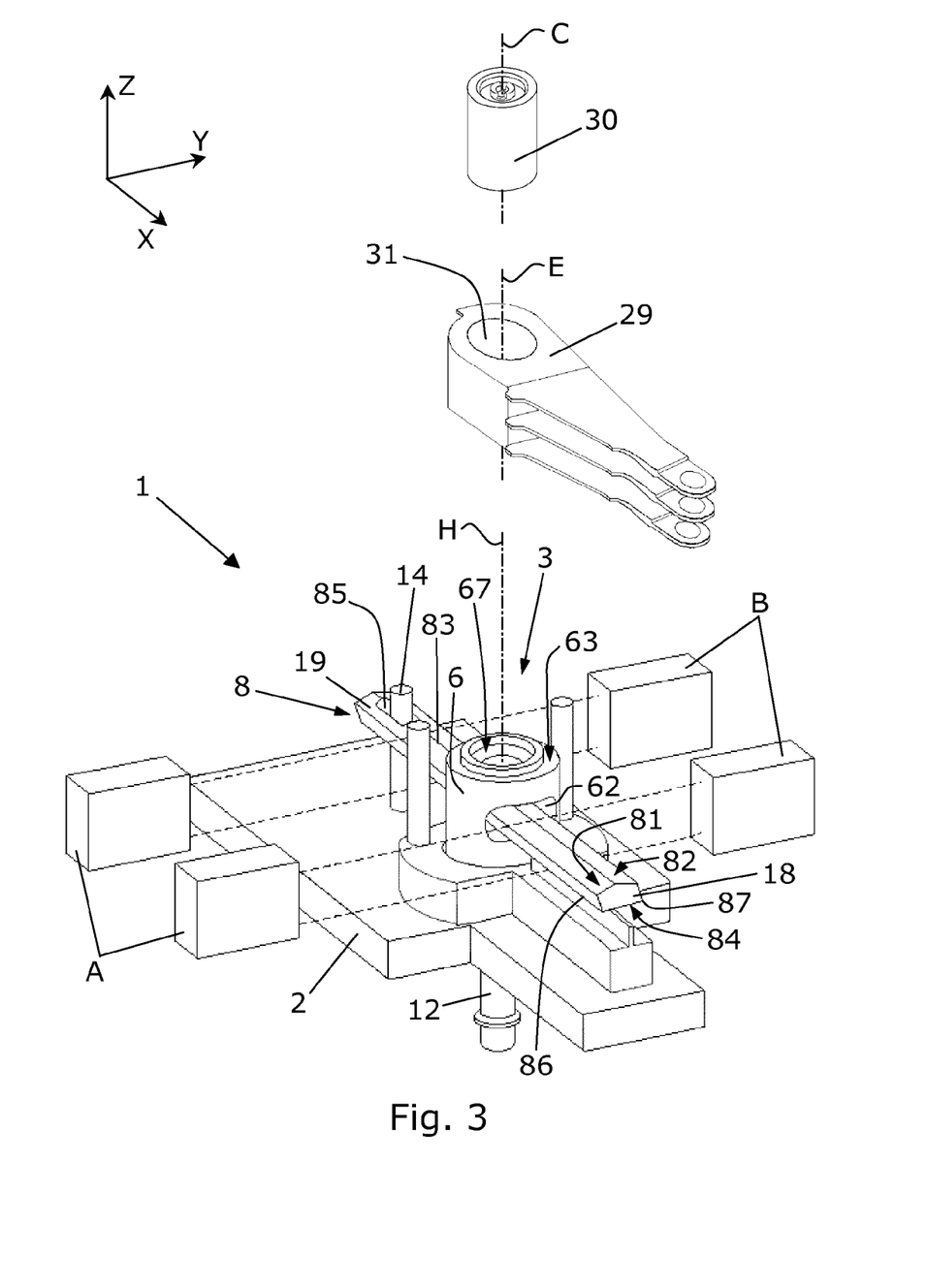
FIG. 3 is a perspective view of the component of FIG. 2, shown in an operating phase different from that illustrated in FIG. 2.

FIG. 1 shows in a schematic way the section of an equipment M for assembling a workpiece with a first component 29 constituted by an E-block provided with a suitable hole 31 apt to define an axis E, and a second component 30 constituted by a bearing designed to allow moving parts to rotate about a rotation axis C with respect to stationary parts (FIG. 3). The equipment M comprises a checking system 1 according to the present invention, that includes a base 2 and a reference system 3, connected to the base 2, with a reference element or nosepiece 6. Referring for example to a right-handed Cartesian coordinate system identified by Cartesian axes X, Y and Z, the reference nosepiece 6 is apt to define a reference plane parallel to the Cartesian axes X and Y, and a main axis H perpendicular to the reference plane. The reference nosepiece 6 substantially features cylindrical shape with a through bore 61, a reference annular surface 63 adapted to locate the E-block 29 so that the axis E of the hole 31 of the E-block 29 is aligned to the main axis H, and two side openings 62. A floating element 8 with two opposite longitudinal portions 18 and 19 is partially housed in the reference nosepiece 6 and protrudes from the two side openings 62, the longitudinal portion 18 and only one side opening 62 being visible in FIG. 1. A size of the floating element 8, more specifically the main size in the embodiment shown in FIGS. 1, 2 and 3, extends around a direction parallel to the reference plane, for example parallel to the Cartesian axis X, therefore orthogonal to the main axis H, and the two side openings 62 feature shape and dimensions such that the floating element 8 is movable with respect to the reference plane and able to assume a position closely related to the position of the bearing 30.

The equipment M comprises also a locking device 4 adapted to lock the E-Block 29 against the reference nosepiece 6, a positioning device 5 adapted to define a starting position of the second component 30, for example a centering element to arrange the bearing 30 so that the rotation axis C of the latter is essentially aligned to the axis E of the hole 31 of the E-Block 29, and an insertion device or piston 9 driven by an actuator 10 to thrust the bearing 30 in a direction parallel to the main axis H and insert it inside the hole 31 as far as it reaches a wanted axial position.

The checking system 1 comprises also a detection system that includes at least two detection devices, for example a first detection device and a second detection device, intended to cooperate with one of the bearing 30 and a specific component of the checking system 1, such specific component being adapted to be coupled to the bearing 30. The checking system 1 is adapted to define at least two checking areas, for example a first checking area and a second checking area, spaced apart from each other. In particular, the first detection device is adapted to define the first checking area and the second detection device is adapted to define the second checking area, said at least two detection devices being intended to operate at the same time, each on the respective checking area. By means of said at least two detection devices cooperating with one of the bearing 30 and the specific component of the checking system 1, the detection system is adapted to detect, at said at least two checking areas, quantities indicative of the mutual disposition, that is the position and the attitude, of the bearing 30 relative to the E-Block 29. To be more precise, the detection system is adapted to detect quantities indicative of the position of the bearing 30 relative to the E-Block 29 during the insertion inside the hole 31 and at least as far as the wanted axial position is reached, and quantities indicative of the attitude of the same bearing 30 in the wanted axial position.

Figure 2:
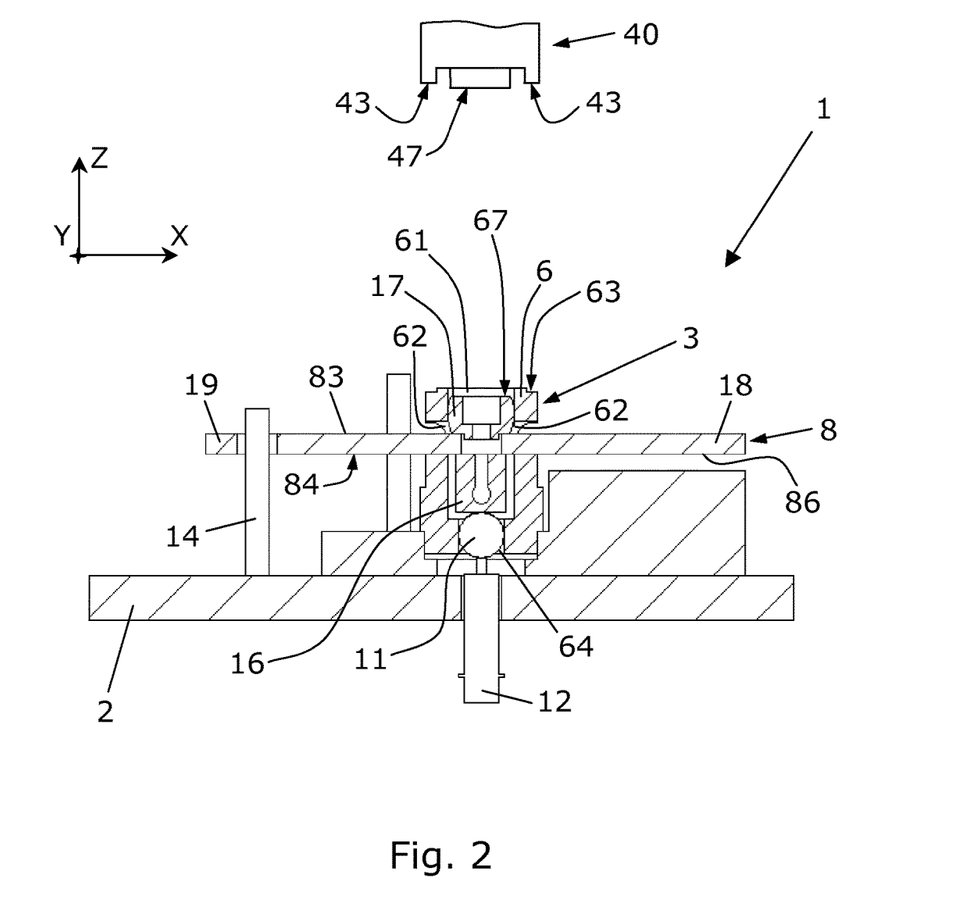
FIG. 2 schematically shows an enlarged longitudinal section along the line II-II of FIG. 1 of a component of the equipment of FIG. 1, in particular a checking system according to a preferred embodiment of the present invention, shown in an operating phase.

In a preferred embodiment of the invention, for example, the already mentioned specific component consists in the floating element 8, and the detection system comprises a first and a second detection devices of optoelectronic shadow casting type, only one of them being visible in FIG. 1, placed each at one of the longitudinal portions 18 and 19 of the floating element 8 and in positions advantageously equidistant from the main axis H, the two detection devices being intended to cooperate with the floating element 8. Alternatively, the specific component can consist in the bearing 30, as a consequence the first and the second detection devices can be intended to cooperate with the bearing 30. Each detection device is adapted to define a check optical plane, perpendicular to the reference plane and including one of said first and second checking areas, and is constituted by an optoelectronic emitter A and an optoelectronic receiver B, to emit and detect, respectively, for example infrared rays (schematically represented in FIGS. 1 and 3 with an area delimited by dotted lines) laying on the check optical plane. In this preferred embodiment, each of the longitudinal portions 18 and 19 of the floating element 8, as being interposed between one emitter A and the related receiver B, is intended to partially intercept the emitted rays at the related checking area that corresponds to a section on the related check optical plane of the same longitudinal portion 18, 19, and determine a grey area on the related receiver B. A processing unit 50 is connected to the detection system, in particular to the receivers B to receive and process information concerning the rays they have detected in order to find out information about the mutual position of the bearing 30 relative to the E-Block 29, in particular the position of the bearing 30 within the hole 31 of the E-block 29. The processing unit 50 is also connected to the actuator 10 to send it control signals. As it is schematically illustrated in the enlargement of FIG. 2, the reference system 3 comprises, besides the reference nosepiece 6, a sphere 11 and a thrust element 12, for example a pneumatic cylinder. The reference nosepiece 6 comprises a lower opening 64 wherein the sphere 11 is housed and can slide along the direction parallel to the main axis H, the sphere 11 being thrust by the pneumatic cylinder 12 and moving, on turn, the floating element 8 by means of a rest element 16 belonging to the checking system 1. The floating element 8 is connected to a coupling element, for example a floating nosepiece 17 with a rest surface 67, adapted to come into contact with the bearing 30 and reproduce the attitude of the latter. In particular, the floating element 8 is tightened by means of a not illustrated screw between the rest element 16 and the floating nosepiece 17.

FIG. 3 shows the floating element 8 suitably shaped. In more detail, in a preferred embodiment of the invention, the floating element 8 is shaped with two converging plane surfaces 81 and 82 which define an edge 83 that lies on a plane, on which the main axis H also lies, perpendicular to the check optical plane. The longitudinal portions 18 and 19 comprise also a check surface 84, opposed to the edge 83, with two longitudinal borders 86 and 87 and has such an orientation, for example it is conveniently inclined less than 10°, to allow, for restricted values of the angle of rotation about the Cartesian axis X, only one of the two longitudinal borders, in FIG. 3 the longitudinal border 86 pointing to the optoelectronic emitters A, to cooperate with the first and the second optoelectronic detection devices, that is to intercept the infrared rays emitted by the emitters A. One of the two longitudinal portions, for example the longitudinal portion 19, comprises a slot 85 for a guide pin 14 connected to the base 2.

The equipment M, by means of the optoelectronic checking system 1, enables the check of the instant position of the bearing 30 relative to the E-Block 29, being said check included in the insertion process, and the check of the roll and pitch angles, respectively defined as rotations about the Cartesian axis X and about the Cartesian axis Y of the reference plane, perpendicular to the main axis H, of the same bearing 30 located at the wanted axial position.

A method for checking according to the present invention is described in detail hereinafter, such method employing the optoelectronic checking system 1 of the equipment M.

In a preliminary phase of calibration, the check of a master 40, partially visible in FIG. 2, is carried out in order to determine the reference values for the subsequent checks. The master 40 is suitably shaped to comprise an external surface 43 that reproduces the theoretical disposition of a positioning surface of the E-block 29, and an internal surface 47 that reproduces the disposition, that is position, pitch angle and roll angle, of a working surface of the bearing 30 at the wanted axial position within the E-block 29. The master 40, at the external surface 43, is located on the reference annular surface 63 of the reference nosepiece 6, and locked by the locking device 4. Then, the pneumatic cylinder 12 thrusts the sphere 11 against the rest element 16. By means of the already cited tightening of the floating element 8 between the rest element 16 and the floating nosepiece 17, the rest surface 67 of the latter comes into contact with the internal surface 47 of the master 40, so that the floating nosepiece 17 reproduces the attitude of the internal surface 47. As a consequence, the floating element 8 assumes the attitude of the floating nosepiece 17, and a position closely related to the position of the master 40. In particular the position of the edge 83 belonging to the floating element 8 is closely related to the position of the internal surface 47 of the master 40.

Each emitter A emits infrared rays directed towards the related receiver B. The longitudinal portions 18 and 19 of the floating element 8 partially intercept the emitted rays and determine a grey area on the receivers B. A receiver B detects the projection along the direction parallel to the main axis H of a section of the longitudinal portion 18, at the same time the other receiver B detects the projection along the same direction of a section of the longitudinal portion 19. For each section, the relative projection is indicative of a virtual thickness of the corresponding longitudinal portion 18, 19, that extends from the projection of the longitudinal border pointing to the optoelectronic emitters A, to the projection of the edge 83, and of a position of the same edge 83. The virtual thickness detected by the optoelectronic detection device mainly depends on the position of the longitudinal border pointing to the optoelectronic emitters A, that depends on the slope of the check surface 84 with respect to the reference plane. Such a slope depends on both the geometric characteristics and the attitude of the floating element 8, said attitude, as previously said, being that of the internal surface 47 of the master 40.

The processing unit 50 receives and processes in a known way the results of the detection to obtain information about the position of the edge 83 and about the attitude of the floating element 8. Reference values, for example equal to zero, can be linked to said position and attitude, that is the pitch angle and the roll angle, of the working surface of the bearing 30 at the wanted axial position within the E-block 29.

For restricted values of the angle of rotation about the Cartesian axis X, detecting both positive variations and negative variation of the roll angle is possible, thanks to the suitable slope of the check surface 84 and to the position of the edge 83. If the slope of the check surface 84 is such that its two longitudinal borders alternatively intercept the infrared rays emitted by the emitters A, and/or the edge 83 has a position different from that previously described, the increase of the detected thickness would not be indicative of the sense of rotation of the floating element 8 about the Cartesian axis X. The highlighted expedients, indeed, make the variation of the virtual thickness directly dependent on the sense of rotation of the floating element 8. Only by way of example, it has to be noted that, with respect to the view of FIG. 3, a clockwise rotation of the floating element 8 about the Cartesian axis X corresponds to a reduction of the virtual thickness (and of the roll angle), whereas a counterclockwise rotation corresponds to an increase of the virtual thickness (and of the roll angle).

Once the preliminary phase of calibration is finished, the master 40 is taken away from the equipment M and the assembly phase occurs, that includes a method for checking according to the present invention.

In this phase, the E-block 29, at the positioning surface, is located on the reference annular surface 63 of the reference nosepiece 6, so that the axis E of the hole 31 is aligned to the main axis H, and locked by the locking device 4, while the bearing 30, by means of the centering element 5, is arranged so that its rotation axis C is essentially aligned to the axis E of the hole 31. The insertion piston 9, driven by the actuator 10, thrusts the bearing 30 in the direction parallel to the main axis H, and makes it move towards the hole 31 and inside it. The pneumatic cylinder 12 thrusts the sphere 11 against the rest element 16 and, by means of the already cited tightening of the floating element 8 between the rest element 16 and the floating nosepiece 17, the rest surface 67 of the floating nosepiece 17 moves towards the bearing 30, up to come into contact with the working surface of the latter. The force exerted by the pneumatic cylinder 12 on the sphere 11 is such as to maintain the rest surface 67 of the floating nosepiece 17 in contact with the working surface of the bearing 30, but not to prevent the advancing movement of the latter. Thus, the floating element 8 assumes a position closely related to an instant position of the bearing 30, in particular the edge 83 of the floating element 8 assumes a position closely related to an instant position of the working surface of the bearing 30, variable during the advancement process and generally different from the reference value defined in the preliminary phase of calibration.

Alike the preliminary phase of calibration, one of the two optoelectronic detection devices detects the projection along the direction parallel to the main axis H of a section of the longitudinal portion 18, at the same time the other of the two optoelectronic detection device detects the projection along the same direction of a section of the longitudinal portion 19. Each of the two detected projection is indicative of the position of the borders of the floating element 8, in particular of the edge 83. The processing unit 50 receives and processes in a known way the values of the upper bounds of the projections detected by the two optoelectronic detection devices in order to obtain information about the position of the edge 83. On the basis of the value of this position and the reference value defined in the preliminary phase of calibration, the processing unit 50 checks in real time the instant position of the working surface of the bearing 30, that is it finds out information about the position of the bearing 30 within the hole 31 of the E-block 29.

The detection and the processing are conveniently carried out in a continuous way during the advancing movement of the bearing 30, as far as the latter reaches the wanted axial position. When it occurs, in particular the instant position of the working surface of the bearing 30 coincides, for less than an acceptable tolerance, with the wanted axial position, the processing unit 50 sends a stop signal to the actuator 10, that, as a consequence, stops the advancing movement of the bearing 30.

At the wanted axial position, the information, acquired during the check of the axial position and that the checking system 1 has available, includes the information necessary to verify also the attitude of the bearing 30, that is the pitch angle and the roll angle of the working surface of the same bearing 30. The virtual thickness of the longitudinal portions 18 and 19 detected by the optoelectronic detection devices, indeed, depends on the slope of the check surface 84 with respect to the reference plane, determined by both the geometric characteristics and the attitude of the floating element 8, attitude which, in this phase, is that of the working surface of the bearing 30. The processing unit 50 can then process in a known way the values of the projections detected by the two optoelectronic detection devices in order to obtain information about the pitch angle and the roll angle of the floating element 8 without carrying out further and distinct checking cycles. On the basis of the results of the processing and the reference values defined in the preliminary phase of calibration, the processing unit 50 verifies the proper attitude of the bearing 30.

Variations can be made to the checking system 1 hitherto described, without departing from the object of the present invention.

Components with shape and/or dimensions different from those illustrated can be utilized, in particular the longitudinal portions 18 and 19 of the floating element 8 can be shaped in a different way and show for example the check surface 84 in place of the edge 83 and vice-versa, or the check surface 84 can be characterized by a different slope.

The two detection devices can be allocated each one of the longitudinal portions 18 and 19 and in any position relative to the main axis H, otherwise both at only one of the longitudinal portions 18 and 19 and at a certain distance from each other.

Possibly, the checking system 1 can carry out the check of the pitch and roll angles of the working surface of the bearing 30 also during the advancing movement of the bearing 30 along the direction parallel to the main axis H and its insertion inside the hole 31 of the E-block 29.

Figure 4:
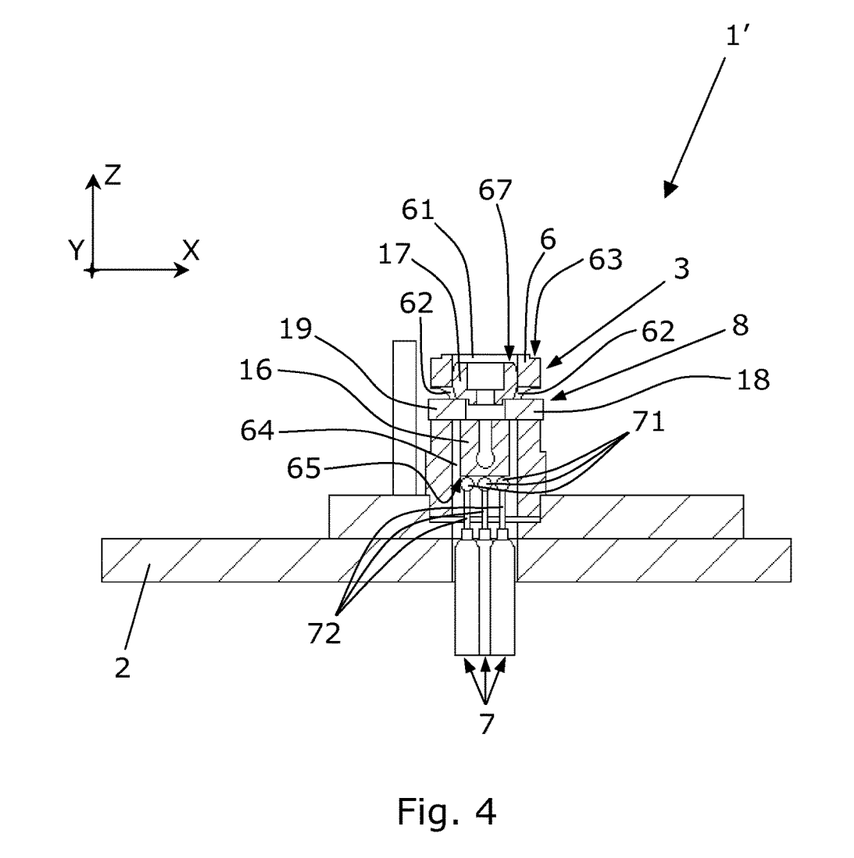
FIG. 4 schematically shows a longitudinal section of a checking system according to an alternative embodiment of the present invention.

FIG. 4 shows a checking system 1' in a different embodiment of the present invention. Unlike the previously described preferred embodiment, in this case the specific component consists in the rest element 16 featuring a checking surface, for example a checking circular surface 65. The detection system comprises also a third detection device adapted to define a third checking area, the three checking areas being spaced from each other and intended to cooperate with the checking circular surface 65. In this case, the first, the second and the third detection devices are partially allocated within the lower opening 64 and connected to the processing unit 50. The three detection devices comprise for example three contact sensors 7 having a touching element or feeler 71 each, adapted to cooperate with, that is to touch, the checking circular surface 65 of the rest element 16, at the first, the second and the third checking area, substantially a point, and a stem 72 with measuring elastic force, adapted to keep the feelers 71 in contact with the checking circular surface 65, connected to a transduction device or transducer, not shown in figure. Alternatively, the stems 72 of the three contact sensors 7 can feature measuring pneumatic thrust, to bring the feelers 71 in contact with the checking circular surface 65 following the control signal received, for example, from the processing unit 50. Preferably, the contact sensors 7 are arranged so that the three checking areas are equidistant from the main axis H and their geometrical center of gravity is a point of the main axis H. In this different embodiment of the invention, the longitudinal portions 18 and 19 can have dimensions smaller than in the preferred embodiment, as it is shown in figure, for benefit of the total amount of space and of the firmness of the checking system 1', although being still partially located each in one of the side openings 62 in order to limit the movements of the rest surface 67 of the floating nosepiece 17.

A method for checking according to the present invention, that uses the checking system 1', is described in the following.

In the preliminary phase of calibration, the master 40, at the external surface 43, is located on the reference annular surface 63 of the reference nosepiece 6, and locked by the locking device 4. Similarly to what previously described, the floating nosepiece 17 and, as a consequence, the checking circular surface 65 of the rest element 16, reproduce the attitude and take a position closely related to the position of the internal surface 47 of the master 40, corresponding to known pitch angle, roll angle and position of the working surface of the bearing 30 put in the wanted axial position inside the E-block 29. Each of the three feelers 71 cooperates with the checking circular surface 65 and the related contact sensor 7 provides an indication of the position of the corresponding checking area. The processing unit 50, in order to obtain information about the position and the attitude of the checking circular surface 65, processes in a known way the results of the detection, to which it links the reference values, for example equal to zero, corresponding to the known position and attitude, that is the pitch and roll angles, of the working surface of the bearing 30 at the wanted axial position inside the E-block 29.

Once the preliminary phase of calibration is finished, the master 40 is taken away from the equipment M, the E-block 29, at the positioning surface, is located on the reference annular surface 63 of the reference nosepiece 6 to align the axis E of the hole 31 to the main axis H, then locked by the locking device 4. The bearing 30, by means of the centering element 5, is arranged so that its rotation axis C is essentially aligned to the axis E of the hole 31, and, by means of the insertion piston 9 driven by the actuator 10, thrusts along a direction parallel to the main axis H towards the hole 31 and inside it. The working surface of the bearing 30 moves towards the floating nosepiece 17 up to the contact with the rest surface 67 of the latter. In this condition, the floating nosepiece 17 and, consequently, the checking circular surface 65 of the rest element 16, assume a position closely related to the position of the working surface of the bearing 30. The three feelers 71 cooperate with the check surface 65 and the related transducers 7 give an indication of the axial position of the corresponding checking areas. The processing unit 50 processes in a known way the results of the detection to obtain information about the position of the check surface 65. Comparing the value of this position with that of the master defined in the preliminary phase of calibration, the processing unit 50 checks in real time the instant position of the working surface of the bearing 30, that is it finds out information about the position of the bearing 30 within the hole 31 of the E-block 29.

Similarly to what previously seen, also the checking system 1' can advantageously carry out in a continuous way the detection and the processing during the advancing movement of the bearing 30. When the instant position of the working surface of the bearing 30 coincides, for less than an acceptable tolerance, with the wanted axial position, the processing unit 50 sends a stop signal to the actuator 10, that, as a consequence, stops the advancing movement of the bearing 30.

Also in this case, as the bearing 30 reaches the wanted axial position, the checking system 1' can advantageously supply information about the pitch and roll angles of the working surface of the bearing 30 and verify the accuracy of the attitude, without carrying out further checking cycles.

As an alternative, the detection system can comprise a different number of detection devices with respect to what stated hitherto, in other words the detection system of the checking system 1 can comprise further optoelectronic detection devices in addition to the described two, and the detection system of the checking system 1' can comprise further contact sensors 7 in addition to the described three, or only two contact sensors 7 suitably arranged, for example to define two checking areas in positions similar to those of FIG. 3.

The advantages that derive from the application of the present invention are evident. The checking system 1, 1' and the methods according to the invention allow carrying out the check of the position of components of a workpiece, in particular of bearings 30 inside the E-block 29, without the need of re-arrange the devices of the detection system to carry out distinct checks at different transversal sections, with favorable increase of the mechanical stability of the system and reduction of the detection time. In addition, they allow carrying out the check of the procedure for assembling workpieces having components such as those cited, and automating said checking procedure by means of a suitable equipment M.

The checking systems 1, 1', the methods and the apparatus M according to the present invention also allow having the information necessary to verify the accuracy of the attitude of the components, in particular of bearings inside the E-block, without carrying out further and different checks in addition to those for checking the position.

The invention claimed is:

1. A checking system for checking a mutual position of a second component of a workpiece relative to a first component of the workpiece, the first component being configured to receive at least a portion of the second component and apt to define an axis, comprising:
    a reference system apt to define a reference plane and a main axis perpendicular to the reference plane, and the first component of the workpiece being located so that the axis of the first component is aligned with the main axis;
    a detection system adapted to define at least a first checking area and a second checking area spaced apart from each other, and detect, at said at least first and second checking areas, quantities indicative of the mutual position of the second component of the workpiece relative to the first component of the workpiece; and
    a processing unit connected to the detection system and adapted to receive and process said quantities in order to find out, in real time, information about said mutual position;
    wherein the detection system comprises at least a first detection device adapted to define the first checking area, and a second detection device adapted to define the second checking area, said at least first and second detection devices being intended to operate at the same time, each on the respective checking area, and cooperate with one of the second component of the workpiece and a specific component of the checking system, said specific component being adapted to be coupled to the second component.

2. The checking system according to claim 1, wherein the reference system comprises a coupling element adapted to come into contact with the second component of the workpiece, and the specific component comprises a floating element connected to the coupling element and that is movable with respect to the reference plane and able to assume a position closely related to the position of said second component, a size of the floating element extending around a direction orthogonal to the main axis, said at least first detection device and second detection device being intended to cooperate with the floating element.

3. The checking system according to claim 1, wherein said first detection device and second detection device are placed equidistant from the main axis.

4. The checking system according to claim 1, wherein said first detection device and second detection device are of the optoelectronic shadow casting type, each detection device being adapted to define a check optical plane comprising one of said first and second checking areas.

5. The checking system according to claim 4, wherein the specific component comprises a floating element that comprises two converging plane surfaces adapted to define an edge lying on a plane passing through the main axis and perpendicular to said two check optical planes, and a checking surface, opposite to the edge, comprising two longitudinal borders, the checking surface having such an orientation to allow substantially only one of the longitudinal borders to cooperate with said first detection device and said second detection device.

6. The checking system according to claim 1, comprising a rest element featuring a checking surface, the specific component comprises the rest element, and the detection system comprises at least a third detection device adapted to define a third checking area, each of said first, second and third detection devices comprising a contact sensor with a feeler, each feeler being adapted to cooperate with the checking surface of the rest element, at one of said first, second and third checking areas.

7. An assembly equipment, to assemble a first component and a second component of a workpiece, comprising:
a locking device adapted to lock the first component of the workpiece against a reference element of the reference system that defines a reference plane and a main axis perpendicular to the reference plane;
a positioning device adapted to define a starting position of the second component of the workpiece;
an insertion device adapted to cooperate with and move substantially along said main axis the second component of the workpiece; and
a checking system for checking the mutual position of said first component and second component of the workpiece, according to claim 1.

8. A method for checking a mutual position of a second component of a workpiece relative to a first component of the workpiece, the first component being configured to receive at least a portion of the second component and apt to define an axis, comprising the steps of:
locating the first component of the workpiece to a reference system apt to define a reference plane and a main axis perpendicular to the reference plane, so that the axis of the first component is aligned with the main axis;
defining at least a first checking area and a second checking area spaced apart from each other;
detecting at said at least first and second checking areas quantities indicative of said mutual position; and
processing such quantities in order to find out information in real time about said mutual position;
wherein the quantities indicative of the mutual position of the second component of the workpiece relative to the first component of the workpiece are detected at the same time at said first checking area and second checking area.

9. The method according to claim 8, comprising the further steps of:
defining said mutual position as an axial position of the second component of the workpiece relative to the first component of the workpiece;
moving the second component of the workpiece with respect to the first component of the workpiece;
wherein the step of detecting and processing the quantities indicative of the axial position of the second component of the workpiece relative to the first component of the workpiece is carried out together with the step of moving the second component of the workpiece, and the reaching of a wanted axial position is checked.

10. A method for assembling a first component and a second component of a workpiece, the first component being apt to define an axis, comprising the steps of:
defining a position of the first component of the workpiece by means of a reference system apt to define a reference plane and a main axis perpendicular to the reference plane, so that the axis of the first component is aligned with the main axis;
locking the position of the first component of the workpiece;
moving the second component of the workpiece towards and inside a hole of the first component of the workpiece substantially along a direction parallel to the main axis;
checking mutual position of said first component of the workpiece and second component of the workpiece along said direction parallel to the main axis with a method according to claim 9;
stopping movement of the second component of the workpiece when it reaches the wanted axial position.

11. The method according to claim 8, comprising the further step of processing said quantities indicative of said mutual position of the second component of the workpiece relative to the first component of the workpiece in order to find out information about the attitude of said second component.

12. The method according to claim 8, wherein said first component of the workpiece is an E-block with a hole that defines the axis, and said second component of the workpiece is a bearing, said mutual position being an axial position of the bearing within the hole of the E-block.

* * * * *